United States Patent
Graziosi (10) Patent No.: US 10,650,554 B2
(45) Date of Patent: May 12, 2020

(54) PACKING STRATEGY SIGNALING

(71) Applicant: SONY CORPORATION, Tokyo (JP)

(72) Inventor: Danillo Graziosi, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/234,179

(22) Filed: Dec. 27, 2018

(65) Prior Publication Data

US 2020/0105023 A1 Apr. 2, 2020

Related U.S. Application Data

(60) Provisional application No. 62/740,481, filed on Oct. 3, 2018, provisional application No. 62/737,610, filed on Sep. 27, 2018.

(51) Int. Cl.
*G06T 9/00* (2006.01)
*G06T 15/04* (2011.01)

(52) U.S. Cl.
CPC .............. *G06T 9/001* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 8,217,941 B2 | 7/2012 | Park et al. | |
| 8,942,467 B2 | 6/2015 | Porikli et al. | |
| 9,824,468 B2 | 11/2017 | Luo et al. | |
| 2015/0100555 A1 | 4/2015 | Tremblay et al. | |
| 2015/0178988 A1 | 6/2015 | Montserrat et al. | |
| 2019/0087979 A1* | 3/2019 | Mammou | G06T 9/001 |
| 2019/0116372 A1* | 4/2019 | Cohen | H04N 19/44 |

OTHER PUBLICATIONS

Ruhnke et al. ("Hierachical Sparse Coded Surface Models") 2014 IEEE International Conference on Robotics & Automation (ICRA) Hong Kong Convention and Exhibition Center May 31-Jun. 7, 2014 (Year: 2014).*
Mairal et al. ("Multiscale Sparse Image Presentation with Learned Dictionary") IEEEE 2007 (Year: 2007).*

* cited by examiner

*Primary Examiner* — Yanna Wu
(74) *Attorney, Agent, or Firm* — Haverstock & Owens LLP (57) ABSTRACT

A novel method for signaling the packing method of 2D patches in canvas images, used in coding of 3D point clouds is described herein. The method utilizes a signal representation to indicate the orientation method to be used by the patches. Furthermore, an optimal method of coding the orientation information of each patch is described.

12 Claims, 5 Drawing Sheets

PACKING STRATEGY SIGNALING

CROSS-REFERENCE TO RELATED APPLICATION(S)

This application claims priority under 35 U.S.C. § 119(e) of the U.S. Provisional Patent Application Ser. No. 62/737,610, filed Sep. 27, 2018 and titled, "PACKING STRATEGY SIGNALING," and the U.S. Provisional Patent Application Ser. No. 62/740,481, filed Oct. 3, 2018 and titled, "PACKING STRATEGY SIGNALING," which are hereby incorporated by reference in their entireties for all purposes.

FIELD OF THE INVENTION

The present invention relates to three dimensional graphics. More specifically, the present invention relates to mapping of three dimensional graphics.

BACKGROUND OF THE INVENTION

The state-of-the-art in point cloud compression using video encoders represents point clouds as 3D patches and encodes a 2D image formed by the projection of geometry and attributes into a 2D canvas. The packing of projected 3D patches into a 2D image is also known as 2D mapping of 3D point cloud data. Currently, the process has some limitations, such as: the patch orientation is always fixed, the position of patches are the same in geometry as well as texture, and the background filling process is the same also for both geometry and texture.

SUMMARY OF THE INVENTION

A novel method for signaling the packing method of 2D patches in canvas images, used in coding of 3D point clouds is described herein. The method utilizes a signal representation to indicate the orientation method to be used by the patches. Furthermore, an optimal method of coding the orientation information of each patch is described.

In one aspect, a method programmed in a non-transitory memory of a device comprises determining a patch orientation and sending patch orientation information including when implementing adaptive packing sending a flag indicating a default orientation. Sending the patch orientation information includes indicating whether fixed patch orientation or adaptive packing is implemented. Fixed patch orientation includes three modes: default, vertical and horizontal. For vertical and horizontal modes, a decoder rotates a patch according to a size of the patch to align a largest dimension vertically for the vertical mode, and horizontally for the horizontal mode. When implementing adaptive packing, utilizing an adaptive dictionary to indicate the patch orientation. The adaptive dictionary is determined based on statistical analysis of patch orientation usage. The adaptive dictionary assigns a lowest code to a most used patch orientation.

In another aspect, an apparatus comprises a non-transitory memory for storing an application, the application for: determining a patch orientation and sending patch orientation information including when implementing adaptive packing sending a flag indicating a default orientation and a processor coupled to the memory, the processor configured for processing the application. Sending the patch orientation information includes indicating whether fixed patch orientation or adaptive packing is implemented. Fixed patch orientation includes three modes: default, vertical and horizontal. For vertical and horizontal modes, a decoder rotates a patch according to a size of the patch to align a largest dimension vertically for the vertical mode, and horizontally for the horizontal mode. When implementing adaptive packing, utilizing an adaptive dictionary to indicate the patch orientation. The adaptive dictionary is determined based on statistical analysis of patch orientation usage. The adaptive dictionary assigns a lowest code to a most used patch orientation.

In another aspect, a system comprises a determination module configured for determining a patch orientation and an sending module configured for sending patch orientation information including when implementing adaptive packing sending a flag indicating a default orientation. Sending the patch orientation information includes indicating whether fixed patch orientation or adaptive packing is implemented. Fixed patch orientation includes three modes: default, vertical and horizontal. For vertical and horizontal modes, a decoder rotates a patch according to a size of the patch to align a largest dimension vertically for the vertical mode, and horizontally for the horizontal mode. When implementing adaptive packing, utilizing an adaptive dictionary to indicate the patch orientation. The adaptive dictionary is determined based on statistical analysis of patch orientation usage. The adaptive dictionary assigns a lowest code to a most used patch orientation.

DETAILED DESCRIPTION OF THE PREFERRED EMBODIMENT

A novel method for signaling the packing method of 2D patches in canvas images, used in coding of 3D point clouds is described herein. The method utilizes a signal representation to indicate the orientation method to be used by the patches. Furthermore, an optimal method of coding the orientation information of each patch is described.

Patches representing geometry and patches representing attributes such as textures are placed in 2D images. As described in U.S. Patent App. No. 62/775,248, titled, "POINT CLOUD MAPPING," which is hereby incorporated by reference in its entirety for all purposes, the patches are able to rotated or mirrored prior to placing them into the 2D canvas for more efficient packing. The orientation information of the patch is signaled by the encoder to the decoder for each patch. A signaling method that makes the flexible orientation approach more efficient is described herein. The transmission method is divided between methods that send the orientation adaptively per patch, and other methods that are fixed, and do not send any per patch orientation information.

For fixed per patch orientation, the orientation of the patch will be derived by the decoder; therefore, no additional information is sent. Three modes are disclosed herein, a default mode, which does not allow the decoder to rotate the patches, and vertical/horizontal modes, where the decoder rotates the patch according to its size, to align the largest dimension either vertically/horizontally. For adaptive per patch orientation, the most probable orientation is encoded with a single flag, and an adaptive dictionary is used for coding the remaining modes.

Figure 1:
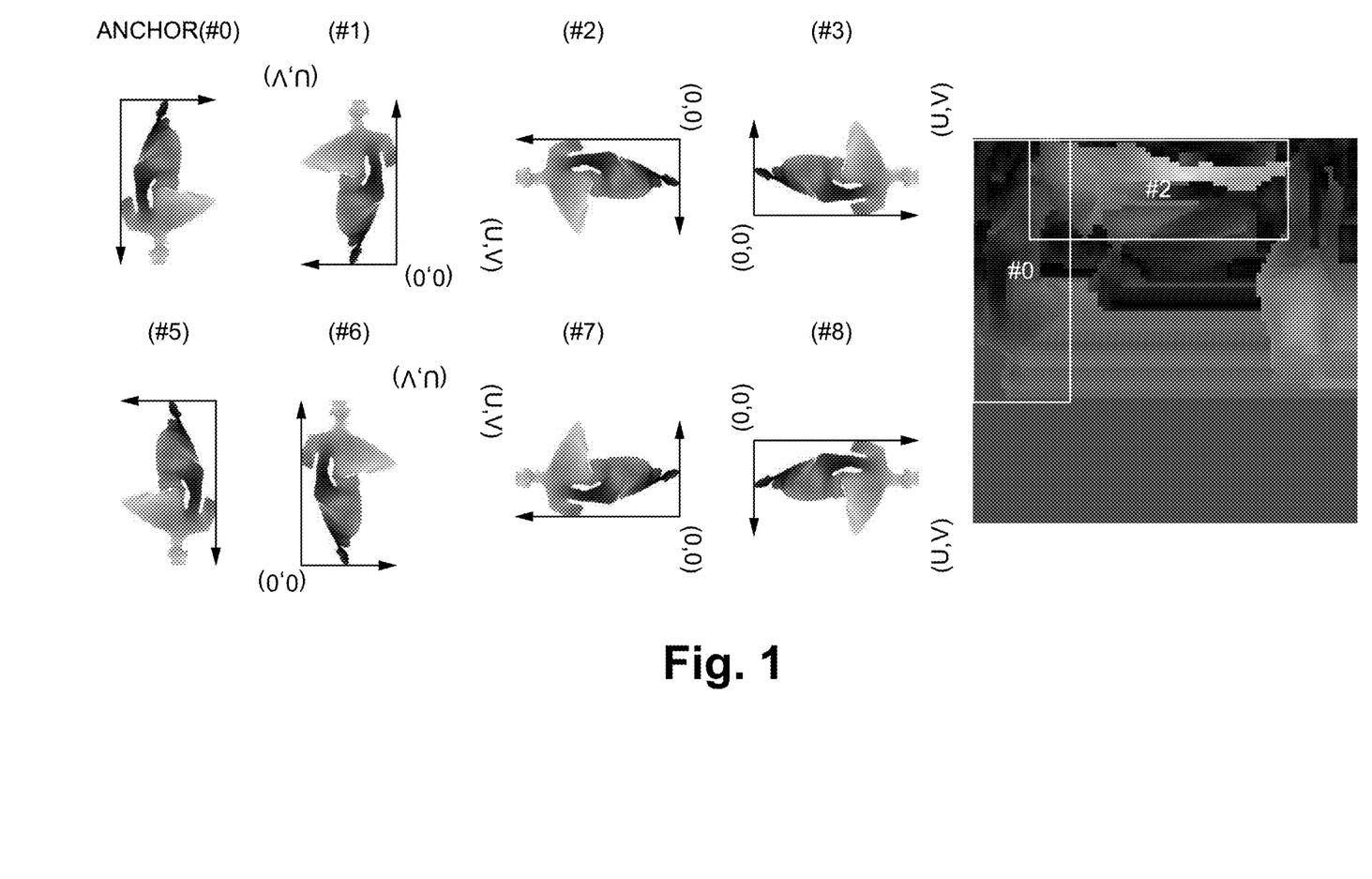
FIG. 1 illustrates flexible patch orientation according to some embodiments.
Figure 2:
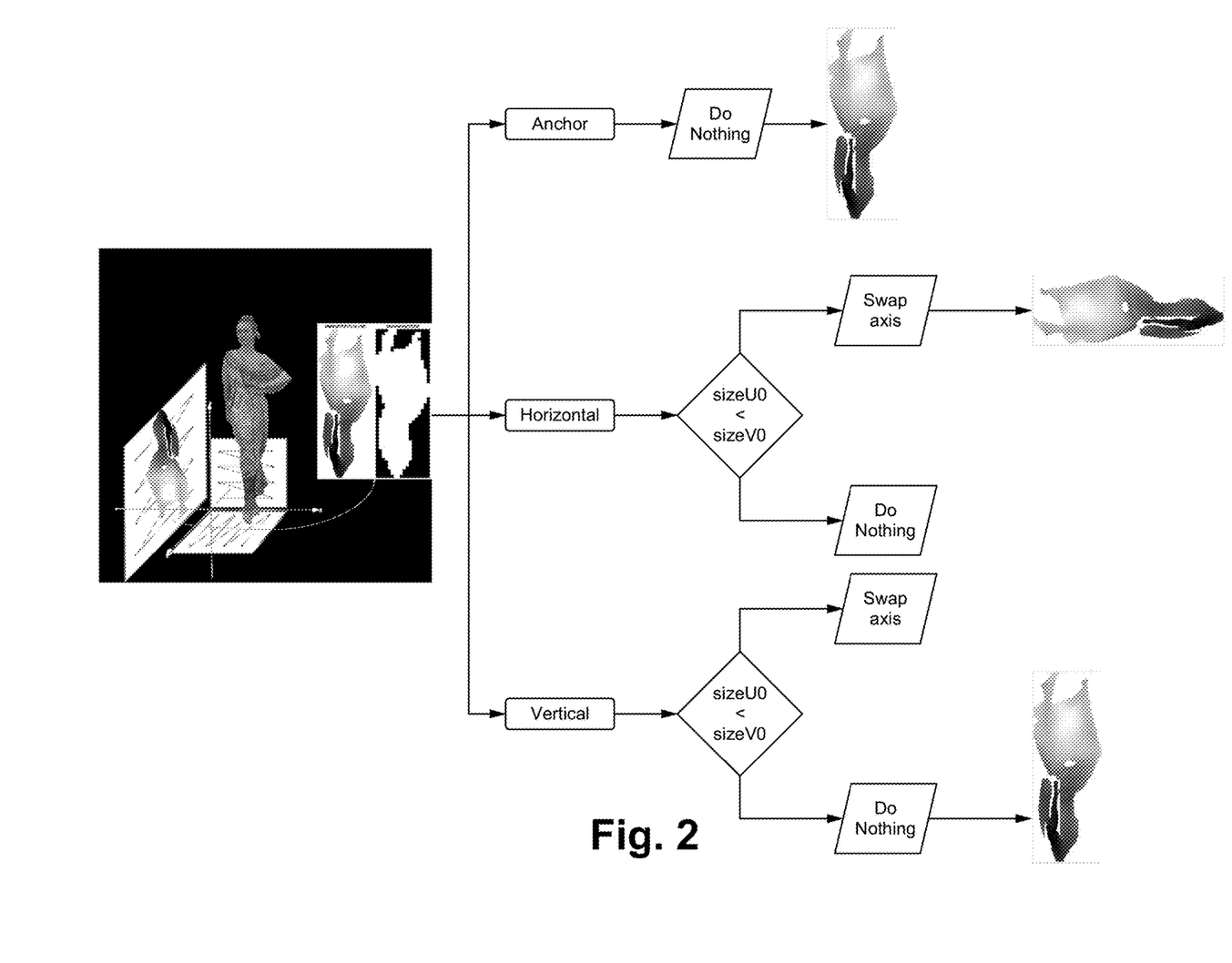
FIG. 2 illustrates a diagram of a method of implementing fixed packing according to some embodiments.

FIG. 1 illustrates flexible patch orientation according to some embodiments. Unlike previous implementations, the patches are able to be rotated, mirrored or otherwise re-oriented. For example, there are 8 different orientations of a patch, although any number of orientations is possible. Furthering the example, #0 is the default orientation, then #1 is the default rotated clock-wise 180 degrees, #2 is the default rotated clock-wise 90 degrees, #3 is the default rotated counter clock-wise 90 degrees, #5 is the default mirrored horizontally, #6 is the default mirrored vertically, #7 is the default rotated clock-wise 90 degrees and mirrored vertically, and #8 is the default rotated counter clock-wise 90 degrees and mirrored vertically. By orienting the patches, the patches are able to be packed tighter which saves memory and enables more efficient compression. Exemplary code includes:

FIG. 2 illustrates a diagram of a method of implementing fixed packing according to some embodiments. As shown in the table above, anchor, horizontal and vertical are all fixed packing implementations. For anchor, the patch orientation is not changed. For horizontal, if size U0 is less than V0, then the axis is swapped; otherwise, nothing is done. For vertical, if size V0 is less than U0, then the axis is swapped; otherwise, nothing is done. No extra metadata is needed per patch since the decoder is able to determine the patch orientation.

Figure 3:
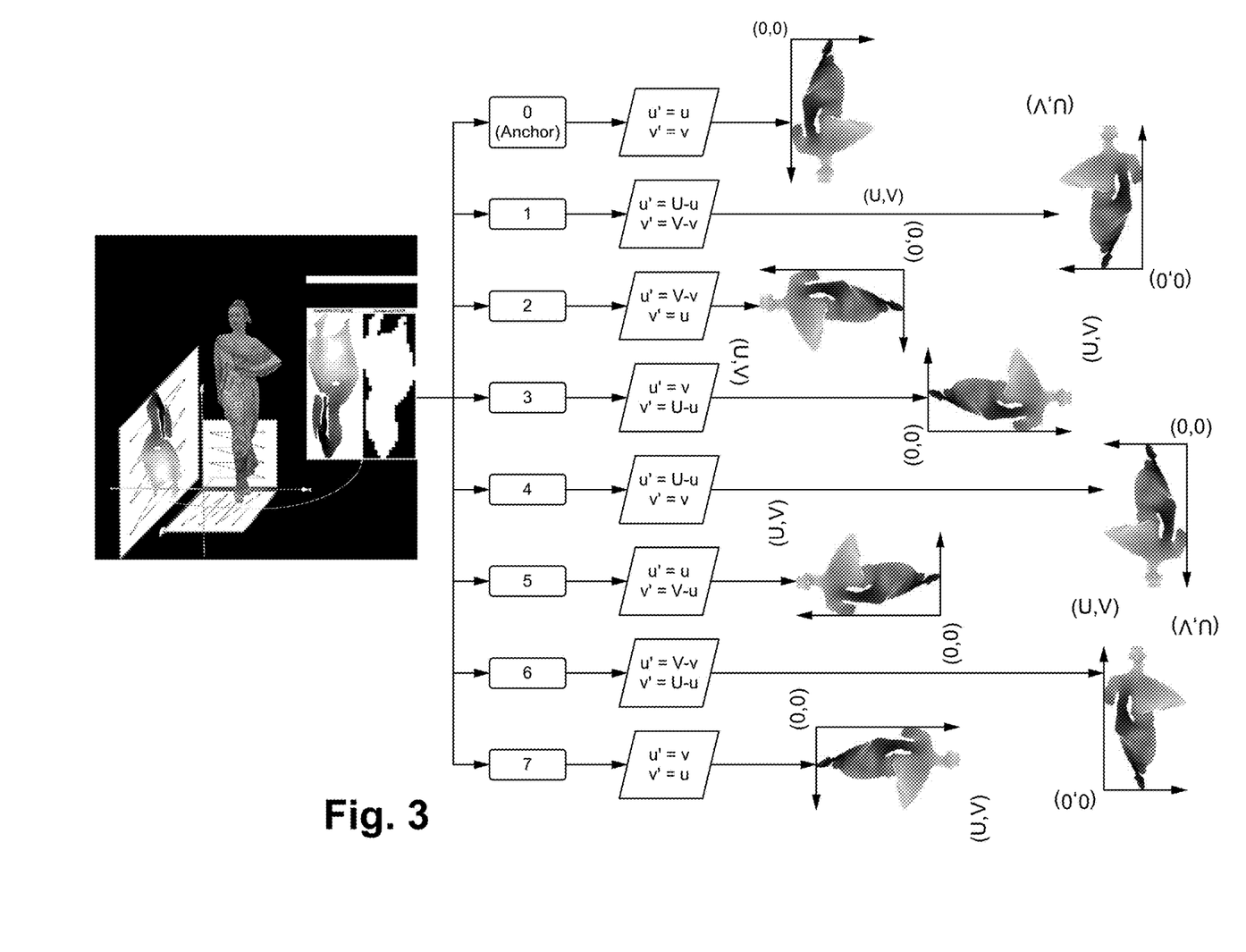
FIG. 3 illustrates a diagram of a method of implementing per-patch adaptation according to some embodiments.

FIG. 3 illustrates a diagram of a method of implementing per-patch adaptation according to some embodiments. For each patch, orientation information is sent to indicate the orientation of the patch. The orientation information is able to be sent as a flag in a packet. The following are exemplary flags for each orientation:

0 or 000: no rotation or flipping: u'=u, v'=v 1 or 001: rotation clockwise 180 degrees: u'=U−u, v'=V−v 2 or 010: rotation clockwise 90 degrees: u'=V−v, v'=u 3 or 011: rotation counter clock-wise 90 degrees: u'=v, v'=U−u 4 or 100: mirrored horizontally: u'=U−u, v'=v 5 or 101: mirrored vertically: u'=u, v'=V−u 6 or 110: rotation clock-wise 90 degrees and mirrored vertically: u'=V−v, v'=U−u 7 or 111: rotation counter clock-wise 90 degrees and mirrored vertically: u'=v, v'=u.

As shown above, the orientation is able to be represented in binary using 3 bits.

TABLE 1

| group_of_frames_auxilary_information() { | Descriptor |
|---|---|
| patch_count | u(32) |
| occupancy_precision | u(8) |
| max_candidate_count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount+=15 | |
| for(i = 0; i<patchCount; i++) { | |
|    patchList[i].patch_u0 | ae(v) |
|    patchList[i].patch_v0 | ae(v) |
|    patchList[i].orientation | ae(3) |
|    patchList[i].patch_u1 | ae(v) |
|    patchList[i].patch_v1 | ae(v) |
|    patchList[i].patch_d1 | ae(v) |
|    patchList[i].delta_size_u0 | se(v) |
|    patchList[i].delta_size_v0 | se(v) |
|    patchList[i].normal_axis | ae(v) |
| } | |
| for (i=0; i<blockCount; i++) { | |
|   if(candidatePatches[i].size( ) == 1) | |
|     blockToPatch[i] = candidatePatches[i][0] | |
|   else { | |
|     candidate_index | ae(v) |
|     if(candidate_index == max_candidate_count) | |
|       blockToPatch[i] = patch_index | ae(v) |
|     else | |
|       blockToPatch[i] = candidatePatches[i][candidate_index] | |
|   } | |
| } | |
| ByteCount += occupancy_auxiliary_stream_size | |
| } | |

| Packing Strategy | Value | Observations |
|---|---|---|
| Fixed packing | 0 (anchor) | No other metadata is sent, |
| | 1 (horizontal) | patch orientations are derived |
| | 2 (vertical) | at the decoder |
| Per-patch adaptation | 3 (flexible) | Send orientation per patch |

Figure 4:
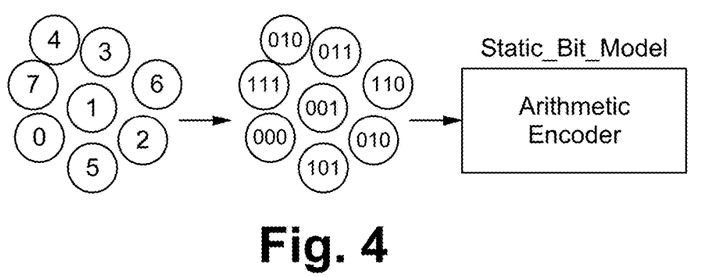
FIG. 4 illustrates the orientation coded with a static bit model according to some embodiments.

FIG. 4 illustrates the orientation coded with a static bit model according to some embodiments. With the static bit model, each orientation is assigned a bit sequence or code and that code does not change.

Figure 5:
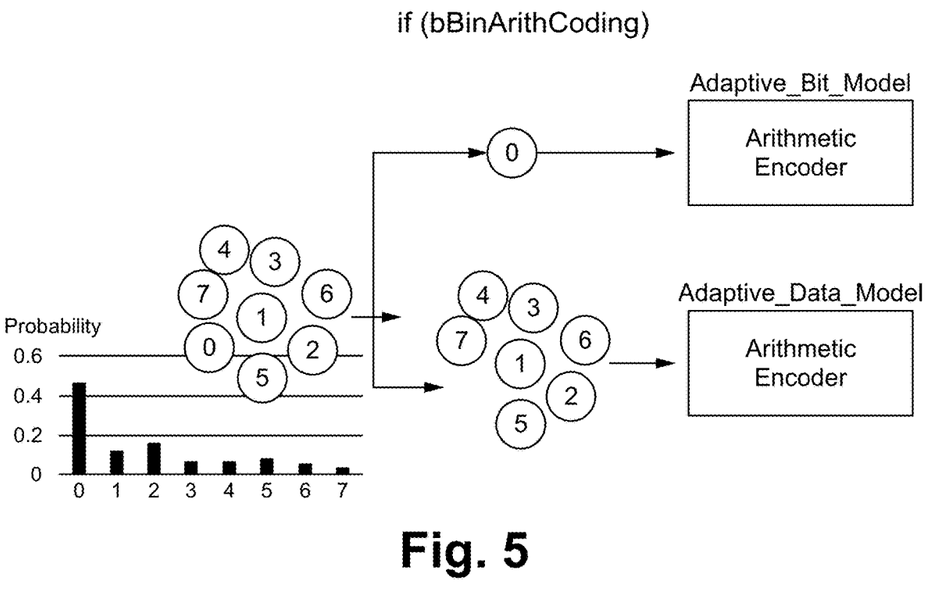
FIG. 5 illustrates the orientation coded with an adaptive data model according to some embodiments.

FIG. 5 illustrates the orientation coded with an adaptive data model according to some embodiments. A flag is able to indicate the most common orientation (e.g., the anchor rotation (or lack thereof)), and then the other orientations are able to be encoded with an adaptive data model (e.g., based on statistical/probability analysis). For example, if orientation #0 (which is not rotated or mirrored) is the most common orientation used, then a flag is able to be sent to indicate the patch is that orientation (e.g., flag=0 indicates unchanged orientation, and flag=1 indicates the orientation is one of the other 7 orientations). Then, 3 bits following the flag indicate the orientation, where the bit code for each orientation is able to be determined based on probability or another scheme. For example, if orientation #2 is the second most common orientation, then the bit code for orientation #2 is 000, and if orientation #1 is the third most common orientation, then the bit code for orientation #3 is 001, and so on. Furthering the example, patch 1 has an unchanged orientation, so 0 is sent, then patch 2 is orientation #2, so 1 is sent followed by 000, and so on.

The following is exemplary code:

```
Auxilliary information data unit
auxilliary_information_data_unit( ) {                         Descriptor
    patch_count_minus1                                        u(32)
    enable_flexible_patch_flag                                u(1)
    if (!auxilliary_information_delta_coding_enabled_flag){
        bit_count_patch_2d_shift_u                            u(8)
        bit_count_patch_2d_shift_v                            u(8)
        bit_count_patch_3d_shift_tangent_axis                 u(8)
        bit_count_patch_3d_shift_bitangent_axis               u(8)
        bit_count_patch_3d_shift_normal_axis                  u(8)
        for( p = 0; p <= patch_count_minus1; p++ ) {
            patch_2d_shift_u[p]                               ae(v)
            patch_2d_shift_v[p]                               ae(v)
            if (enable_flexible_patch_flag)
                flexible_patch_present_flag                   u(1) or ae(v)
            if (flexible_patch_present_flag)
                flexible_patch_orientation                    ae(v)
                patch_3d_shift_tangent_axisp]                 ae(v)
                patch_3d_shift_bitangent_axis[p]              ae(v)
                patch_3d_shift_normal_axis[p]                 ae(v)
                delta_size_u0[p]                              se(v)
                delta_size_v0[p]                              se(v)
                normal_axis[p]                                ae(v)
        }
    } else {
        maximum_from_umatched_patch_flag                      u(1)
        if(maximum_from_umatched_patch_flag) {
            maximum_item_indication                           u(5)
            for(i = 0; i < 5; i++) {
            if(maximum_item_indication[i] {
                    bit_count_un-                             u(8)
                    matched_patch_item[i]
                }
            }
        }
        matched_patch_count_minus1                            ae(v)
        for( p = 0; p <= matched_patch_count_minus1; p++) {
            delta_patch_index[p]
            delta_patch_2d_shift_u[p]                         ae(v)
            delta_patch_2d_shift_v[p]                         ae(v)
            delta_patch_3d_shift_tangent_axis[p]              ae(v)
            delta_patch_3d_shift_bitangent_axis[p]            ae(v)
            delta_patch_3d_shift_normal_axis[p]               ae(v)
            delta_size_u0[p]                                  se(v)
            delta size v0[p]                                  se(v)
        }
        for( p = matched_patch_count_minus1+1; p <=
        patch_count_minus1; p++) {
            patch_2d_shift_u[p]                               ae(v)
            patch_2d_shift_v[p]                               ae(v)
            if (enable_flexible_patch_flag)
                flexible_patch_present flag                   u(1) or ae(v)
            if (flexible_patch_present_flag)
                flexible_patch_orientation                    ae(v)
                patch_3d_shift_tangent_axis[p]                ae(v)
                patch_3d_shift_bitangent_axis[p]              ae(v)
                patch_3d_shift_normal_axis[p]                 ae(v)
                delta_size_u0[p]                              se(v)
                delta_size_v0[p]                              se(v)
                normal_axis[p]                                ae(v)
        }
    }
    for( i =0; i < BlockCount; i++ ) {
        if( candidatePatches[i].size( ) == 1 ) {
            blockToPatch[i] = candidatePatches[i][0]
        } else {
            candidate_index                                   ae(v)
            if (candidate_index ==
            max_candidate_count ) {
                blockToPatch[i] = patch_index                 ae(v)
            } else {
                blockToPatch[i] = candidatePatches[i]
                    [candidate_index]
            }
        }
    }
}
```

Figure 6:
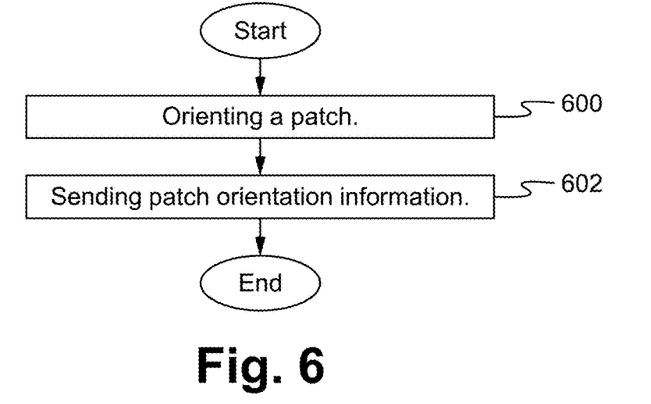
FIG. 6 illustrates a flowchart of a packing strategy signaling method according to some embodiments.

FIG. 6 illustrates a flowchart of a packing strategy signaling method according to some embodiments. In the step 600, a patch is oriented on a 2D canvas. The patch orientation is able to be determined in any manner such as by determining which orientation minimizes an amount of open space on the 2D canvas, utilizing a Tetris-like approach, or by determining which is greater—length or width, and adjusting the patch so one is consistently greater. In the step 602, patch orientation information is sent (e.g., by an encoder to a decoder). Sending the patch orientation information is able to be implemented in any manner such as in a header. The patch orientation is able to be applied using fixed packing, adaptive packing or both. In some embodiments, it is indicated whether fixed packing or adaptive packing is implemented for each patch. If fixed packing is implemented for a patch, then the decoder determines the patch orientation. If adaptive packing is implemented for a patch, the orientation information is able to be sent in n bits (e.g., 3 or 4 bits). In some embodiments, adaptive packing utilizes a flag to indicate anchor rotation, and then other orientations are coded with an adaptive data model.

In some embodiments, the method includes fewer or additional steps. For example, the method includes the steps: 3D geometry acquisition, 3D patch generation, 3D patch correspondence, 3D matched patch motion compensation and 2D motion compensation. In some embodiments, decoder-side steps are implemented as well such as determining the orientation of a patch when fixed packing is utilized, or decoding adaptive packing. In some embodiments, the order of the steps is modified.

Figure 7:
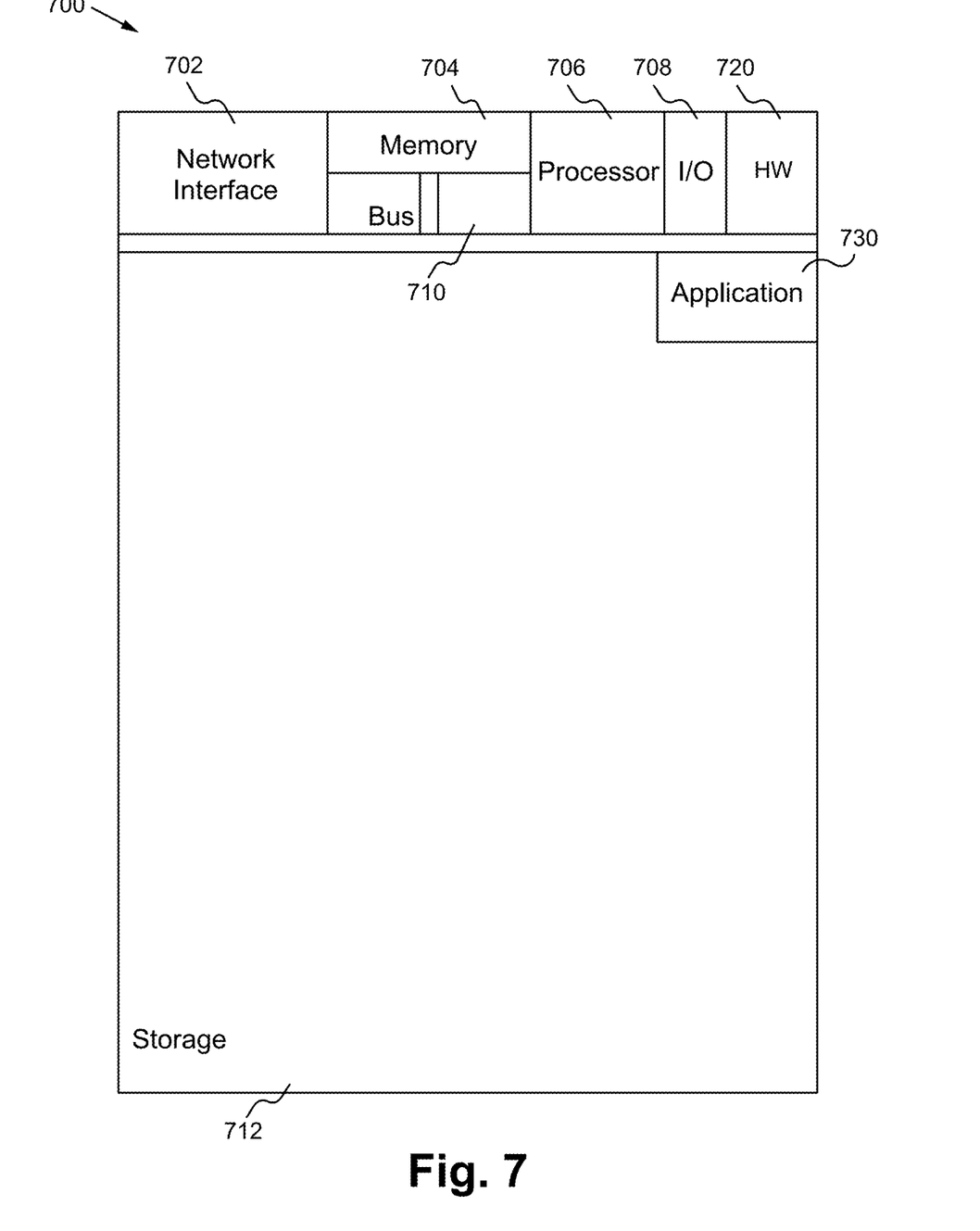
FIG. 7 illustrates a block diagram of an exemplary computing device configured to implement the packing strategy signaling method according to some embodiments.

FIG. 7 illustrates a block diagram of an exemplary computing device configured to implement the packing strategy signaling method according to some embodiments. The computing device 700 is able to be used to acquire, store, compute, process, communicate and/or display information such as images and videos including 3D content. The computing device 700 is able to implement any of the packing strategy signaling method aspects. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. Packing strategy signaling application(s) 730 used to implement the packing strategy signaling method are likely to be stored in the storage device 712 and memory 704 and processed as applications are typically processed. More or fewer components shown in FIG. 7 are able to be included in the computing device 700. In some embodiments, packing strategy signaling hardware 720 is included. Although the computing device 700 in FIG. 7 includes applications 730 and hardware 720 for the packing strategy signaling method, the packing strategy signaling method is able to be implemented on a computing device in hardware, firmware, software or any combination thereof. For example, in some embodiments, the packing strategy signaling applications 730 are programmed in a memory and executed using a processor. In another example, in some embodiments, the packing strategy signaling hardware 720 is programmed hardware logic including gates specifically designed to implement the packing strategy signaling method.

In some embodiments, the packing strategy signaling application(s) 730 include several applications and/or modules. In some embodiments, modules include one or more sub-modules as well. In some embodiments, fewer or additional modules are able to be included.

In some embodiments, the packing strategy signaling hardware 720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the packing strategy signaling method described herein, a device acquires or receives 3D content and processes and/or sends the content in an optimized manner to enable proper, efficient display of the 3D content. The packing strategy signaling method is able to be implemented with user assistance or automatically without user involvement.

In operation, the packing strategy signaling method more efficiently processes 3D content including compressing the data such that much less information is sent. Analysis shows that by implementing the packing strategy signaling method, bit rates of transmitting 3D content are improved.

Some Embodiments of Packing Strategy Signaling

1. A method programmed in a non-transitory memory of a device comprising:
   determining a patch orientation; and
   sending patch orientation information including when implementing adaptive packing sending a flag indicating a default orientation.
2. The method of clause 1 wherein sending the patch orientation information includes indicating whether fixed patch orientation or adaptive packing is implemented.
3. The method of clause 2 wherein fixed patch orientation includes three modes: default, vertical and horizontal.
4. The method of clause 3 wherein for vertical and horizontal modes, a decoder rotates a patch according to a size of the patch to align a largest dimension vertically for the vertical mode, and horizontally for the horizontal mode.
5. The method of clause 1 wherein when implementing adaptive packing, utilizing an adaptive dictionary to indicate the patch orientation.
6. The method of clause 5 wherein the adaptive dictionary is determined based on statistical analysis of patch orientation usage.
7. The method of clause 6 wherein the adaptive dictionary assigns a lowest code to a most used patch orientation.
8. An apparatus comprising:
   a non-transitory memory for storing an application, the application for:
      determining a patch orientation; and
      sending patch orientation information including when implementing adaptive packing sending a flag indicating a default orientation; and
   a processor coupled to the memory, the processor configured for processing the application.
9. The apparatus of clause 8 wherein sending the patch orientation information includes indicating whether fixed patch orientation or adaptive packing is implemented.
10. The apparatus of clause 9 wherein fixed patch orientation includes three modes: default, vertical and horizontal.
11. The apparatus of clause 10 wherein for vertical and horizontal modes, a decoder rotates a patch according to a size of the patch to align a largest dimension vertically for the vertical mode, and horizontally for the horizontal mode.
12. The apparatus of clause 8 wherein when implementing adaptive packing, utilizing an adaptive dictionary to indicate the patch orientation.
13. The apparatus of clause 12 wherein the adaptive dictionary is determined based on statistical analysis of patch orientation usage.
14. The apparatus of clause 13 wherein the adaptive dictionary assigns a lowest code to a most used patch orientation.
15. A system comprising:
   a determination module configured for determining a patch orientation; and
   an sending module configured for sending patch orientation information including when implementing adaptive packing sending a flag indicating a default orientation.
16. The system of clause 15 wherein sending the patch orientation information includes indicating whether fixed patch orientation or adaptive packing is implemented.
17. The system of clause 16 wherein fixed patch orientation includes three modes: default, vertical and horizontal.
18. The system of clause 17 wherein for vertical and horizontal modes, a decoder rotates a patch according to a size of the patch to align a largest dimension vertically for the vertical mode, and horizontally for the horizontal mode.

19. The system of clause 15 wherein when implementing adaptive packing, utilizing an adaptive dictionary to indicate the patch orientation.
20. The system of clause 19 wherein the adaptive dictionary is determined based on statistical analysis of patch orientation usage.
21. The system of clause 20 wherein the adaptive dictionary assigns a lowest code to a most used patch orientation.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    determining a patch orientation; and
    sending patch orientation information including when implementing adaptive packing sending a flag indicating a default orientation, and when implementing adaptive packing, utilizing an adaptive dictionary to indicate the patch orientation, wherein the adaptive dictionary is determined based on statistical analysis of patch orientation usage, and wherein the adaptive dictionary assigns a lowest code to a most used patch orientation.

2. The method of claim 1, wherein sending the patch orientation information includes indicating whether fixed patch orientation or adaptive packing is implemented.

3. The method of claim 2, wherein the fixed patch orientation includes three modes: default, vertical and horizontal.

4. The method of claim 3, wherein for the vertical and the horizontal modes, a decoder rotates a patch according to a size of the patch to align a largest dimension vertically for the vertical mode, and horizontally for the horizontal mode.

5. An apparatus comprising:
    a non-transitory memory for storing an application, the application for:
        determining a patch orientation; and
        sending patch orientation information including when implementing adaptive packing sending a flag indicating a default orientation, and when implementing adaptive packing, utilizing an adaptive dictionary to indicate the patch orientation, wherein the adaptive dictionary is determined based on statistical analysis of patch orientation usage, and wherein the adaptive dictionary assigns a lowest code to a most used patch orientation; and
    a processor coupled to the memory, the processor configured for processing the application.

6. The apparatus of claim 5, wherein sending the patch orientation information includes indicating whether fixed patch orientation or adaptive packing is implemented.

7. The apparatus of claim 6, wherein the fixed patch orientation includes three modes: default, vertical and horizontal.

8. The apparatus of claim 7, wherein for the vertical and the horizontal modes, a decoder rotates a patch according to a size of the patch to align a largest dimension vertically for the vertical mode, and horizontally for the horizontal mode.

9. A system comprising:
    a determination module configured for determining a patch orientation; and
    an sending module configured for sending patch orientation information including when implementing adaptive packing sending a flag indicating a default orientation, and when implementing adaptive packing, utilizing an adaptive dictionary to indicate the patch orientation, wherein the adaptive dictionary is determined based on statistical analysis of patch orientation usage, and wherein the adaptive dictionary assigns a lowest code to a most used patch orientation.

10. The system of claim 9, wherein sending the patch orientation information includes indicating whether fixed patch orientation or adaptive packing is implemented.

11. The system of claim 10, wherein the fixed patch orientation includes three modes: default, vertical and horizontal.

12. The system of claim 11, wherein for the vertical and the horizontal modes, a decoder rotates a patch according to a size of the patch to align a largest dimension vertically for the vertical mode, and horizontally for the horizontal mode.

* * * * *